UNITED STATES PATENT OFFICE.

HENRY STALAY ARTHUR HOLT, OF LUDWIGSHAFEN-ON-THE-RHINE, GERMANY, ASSIGNOR TO BADISCHE ANILIN & SODA FABRIK, OF LUDWIGSHAFEN-ON-THE-RHINE, GERMANY, A CORPORATION OF GERMANY.

INDIGO COLOR AND PROCESS OF MAKING SAME.

SPECIFICATION forming part of Letters Patent No. 715,074, dated December 2, 1902.

Application filed October 8, 1901. Serial No. 77,978. (No specimens.)

*To all whom it may concern:*

Be it known that I, HENRY STALAY ARTHUR HOLT, a doctor of philosophy and a chemist, a subject of the King of Great Britain and Ireland, residing at Ludwigshafen-on-the-Rhine, in the Kingdom of Bavaria, Germany, have invented new and useful Improvements in New Substituted Indigo and Processes for the Production of Indigo, of which the following is a specification.

This invention relates to the production of new brominated indigo and ordinary indigo.

In the application for Letters Patent Serial No. 77,977, of even date herewith, I have described new halogen substituted indoxyls. I have discovered that these new halogen substituted indoxyls can be caused to condense with an indoxylic body when treated with a suitable agent which will remove halogen or halogen acid and does not necessarily exert an oxidizing action on the bodies being condensed. By "indoxylic body" I understand either halogen indoxyl, as above mentioned, or indoxyl itself, so that according to this invention I condense one molecular proportion of a new halogen indoxyl either with another molecular proportion of a new halogen indoxyl or with one molecular proportion of indoxyl itself, in both cases obtaining one molecular proportion of an indigo. Thus brom-indoxyl on treatment with hot hydrochloric-acid solution or on boiling with an alcoholic or aqueous solution of sodium acetate or the like or on heating with organic bases, such as pyridin or anilin, condenses with itself, two molecular proportions thereof condensing together to form one molecular proportion of a new brominated indigo; but chlor and iodo indoxyl on similar treatment while also condensing with themselves in a similar manner yield from two molecular proportions thereof one molecular proportion of ordinary indigo, the halogen being simultaneously split off. The same change can be effected by heating the halogen indoxyls with water to a high temperature or by allowing them to remain in a moist condition at ordinary temperature for a sufficient length of time and also by the action of alkali and air or of ferric chlorid in the known manner. Further, a new brominated indigo or a leuco compound thereof can also be prepared by treating one molecular proportion of brom-indoxyl and one molecular proportion of indoxyl with a suitable condensing agent—for instance, by treating a mixture of equal molecular proportions of the two bodies with air and an aqueous solution of caustic alkali, (by blowing air through the solution.) In this case one molecular proportion of the brom-indoxyl condenses with one molecular proportion of the indoxyl, yielding one molecular proportion of brom-indigo. Similarly when one molecular proportion of chlor or iodo indoxyl is treated with one molecular proportion of indoxyl it condenses therewith, and in this manner one molecular proportion of ordinary non-halogenated indigo is formed. The brominated indigos which can thus be obtained are blue metallic powders which sublime, yielding deep violet vapors. They differ from ordinary indigo in containing bromin and in dyeing cotton shades which are more violet or redder than those obtained from ordinary indigo.

The following examples will serve to further illustrate the nature of my invention and the manner in which the same may be carried into practical effect; but the invention is not confined to these examples. The parts are by weight.

*Example 1. Production of brominated indigo from brom-indoxyl by means of an organic base.*—To fifty (50) parts of pyridin add ten (10) parts of brom-indoxyl (either dry or in a moist condition) and warm for some hours on the boiling-water bath until no further increase in the formation of indigo coloring-matter can be observed. When cool, drain on the pump and wash with alcohol to free the formed indigo coloring-matter from pyridin. Instead of pyridin other bases which remove halogen acids from organic bodies—such as anilin, diethyl-anilin, and the like—can be employed. By employing chlor or iodo indoxyl or a mixture of either of these bodies with indoxyl in place of brom-indoxyl in this example and proceeding as set forth ordinary non-halogenated indigo can be obtained.

*Example 2. Production of a brominated indigo from brom-indoxyl by means of sodium acetate.*—Dissolve ten (10) parts of brom-indoxyl in about fifty (50) parts of alcohol and add three (3) parts of crystallized sodium acetate to the solution. Heat for some time to boiling. Then cool the whole and filter to collect the coloring-matter formed, drain on the pump, and free the said coloring-matter from any soluble salts present by washing with water.

*Example 3. Condensation of brom-indoxyl with indoxyl to form a brominated indigo.*—Into an alkaline solution of thirteen (13) parts of indoxyl introduce the brom-indoxyl obtained from thirteen (13) parts of indoxyl as described in Example 1 of the application for Letters Patent, Serial No. 77,977, of even date herewith and oxidize by means of air the mixture obtained. A brominated indigo is precipitated. After being drained on the pump, washed, and dried it is in the condition of a blue powder, which sublimes in violet vapors. It dyes textile fiber shades which are redder and more brilliant than those obtained from ordinary indigo.

In the following table some of the properties of my new brom-indigo are given, as also a comparison of these properties with some of those of ordinary indigo and the known brom-indigos:

| | Ordinary indigo. | Brom-indigo obtained according to Example 3. | Brom-indigo obtained according to Example 1. | Para-di-brom-indigo. | Meta-di-brom-indigo. |
|---|---|---|---|---|---|
| Appearance in the dry condition. | | Blue. | Blue. | Blue. | Red. |
| Solution in— | | | | | |
| Concentrated sulfuric acid. | Yellow-green | Brown-green | Green-blue | Green | Brown-yellow. |
| Boiling glacial acetic acid. | Green-blue; but slightly soluble. | Reddish blue; but slightly soluble. | Blue; very slightly soluble. | Blue; almost insoluble. | Insoluble. |
| Cold glacial acetic acid. | Almost insoluble. | More soluble than ordinary indigo. | More soluble than ordinary indigo. | Almost completely insoluble. | Insoluble. |
| Cold anilin | Blue; slightly soluble. | Blue; fairly soluble. | Green-blue; fairly soluble. | Insoluble. | Insoluble. |
| Carbon disulfid | Insoluble. | Green; fairly soluble. | Blue; slightly soluble. | Insoluble. | Insoluble. |
| Chloroform | Reddish blue; very slightly soluble. | Blue; soluble to a considerable extent. | Blue; fairly soluble. | Reddish blue; very slightly soluble. | Insoluble. |
| Vat on reduction | Pure yellow. | Brown-yellow. | Brown-yellow. | Brown-yellow. | Brown-yellow. |

Now what I claim is—

1. The process for the production of indigo coloring-matter by condensing halogen indoxyl with an indoxylic body.

2. The process for the production of indigo coloring-matter by condensing halogen indoxyl with halogen indoxyl.

3. The process for the production of indigo coloring-matter by condensing brom-indoxyl with an indoxylic body.

4. The process for the production of indigo coloring-matter by condensing brom-indoxyl with brom-indoxyl.

5. The new brominated indigo coloring-matter such as can be obtained by treating brom-indoxyl and an indoxylic body with a condensing agent, which is a blue substance containing bromin, soluble in cold anilin with a blue-green to blue color, soluble in carbon disulfid with a blue to green color, and yields a brown-yellow vat.

In testimony whereof I have hereunto set my hand in the presence of two subscribing witnesses.

HENRY STALAY ARTHUR HOLT.

Witnesses:
JOH. L. HEINKE,
JACOB ADRIAN.